May 6, 1952 — E. E. ROSECRANS, SR — 2,595,705
INSERT FITTING
Filed March 8, 1949
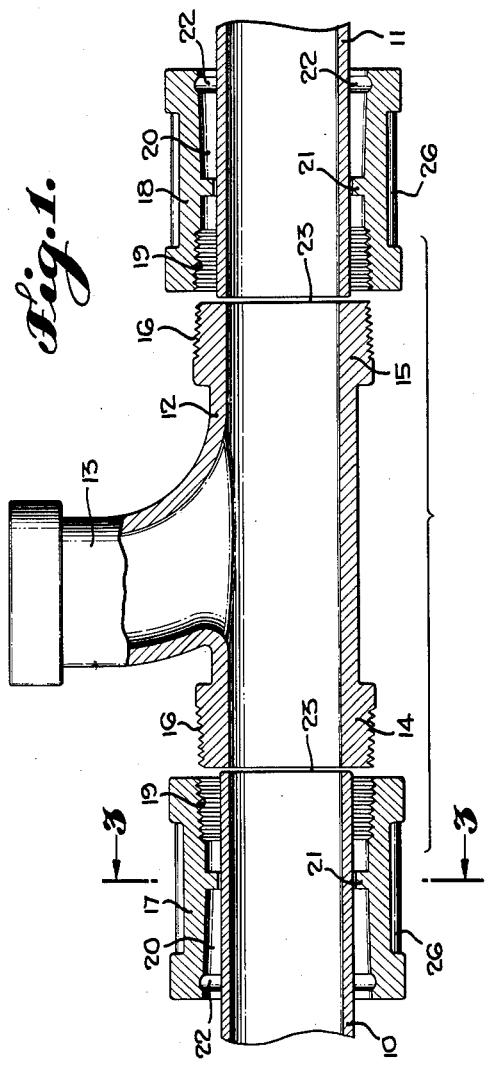
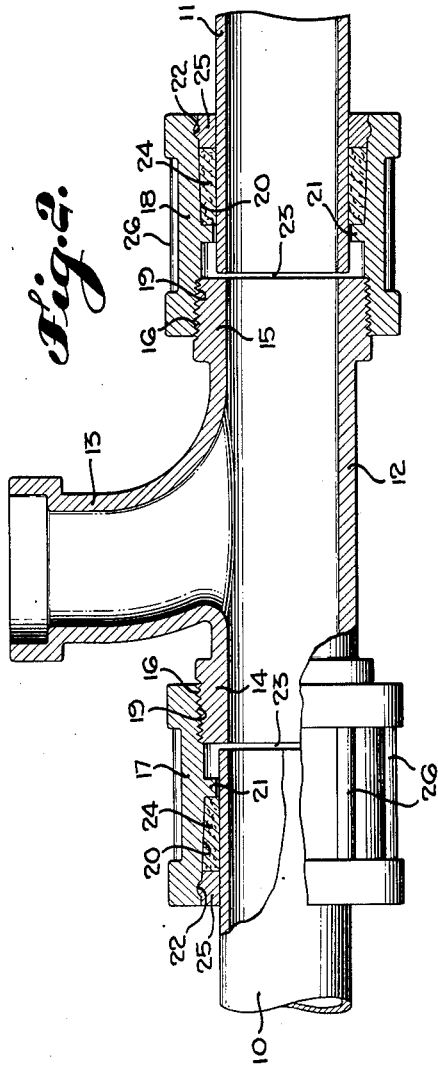
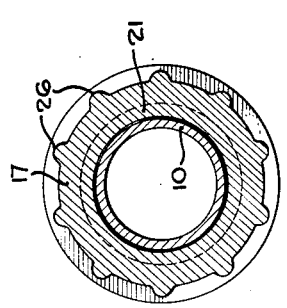
ERNEST E. ROSECRANS, SR.
INVENTOR.
BY Hazard & Miller
ATTORNEYS

Patented May 6, 1952

2,595,705

UNITED STATES PATENT OFFICE 2,595,705

INSERT FITTING

Ernest E. Rosecrans, Sr., Los Angeles, Calif.

Application March 8, 1949, Serial No. 80,107

2 Claims. (Cl. 285—116)

This invention relates to improvements in insert fittings adapted to be inserted between two aligned ends of a pipe line.

An object of the invention is to provide an improved insert fitting which has the advantages of being relatively short in its overall length and which, when in installed position, insures the formation of a tight or leakproof joint and which is also so designed that when the hubs thereof are caulked with oakum or equivalent sealing material there is no opportunity or danger of the oakum or sealing material entering between the pipe ends and the ends of the insert fitting.

With the foregoing and other objects in view, which will be made manifest in the following detailed description and specifically pointed out in the appended claims, reference is had to the accompanying drawings for an illustrative embodiment of the invention, wherein:

Figure 1 is a sectional view illustrating the manner in which the insert fitting embodying the present invention is inserted between two ends of a pipe line;

Fig. 2 is a similar view but illustrating the fitting as having been completely installed; and Fig. 3 is a vertical section taken substantially upon the line 3—3 upon Fig. 1 in the direction indicated.

Referring to the accompanying drawings wherein similar reference characters designate similar parts throughout, 10 and 11 indicate the two ends of a pipe line which has been cut to enable the insert fitting 12 to be inserted therebetween. The fitting 12 consists generally of a conduit having aligned opposite ends arranged to be positioned in opposition to the ends 10 and 11 of the pipe line. This fitting may be either in the form of a T fitting, a Y fitting, or a combination fitting or, in some instances, it may consist of merely a cylindrical tubular section. In the present instance it has been illustrated as having a lateral branch indicated at 13. The opposite ends 14 and 15 of the fitting are externally thickened and have sets of tapered threads 16 cut thereon. These threads taper outwardly and may conform in their taper to the conventional tapered threads used in plumbing generally. The diameter on which the threads are cut is somewhat in excess of the external diameter of the pipe ends 10 and 11.

Hubs are provided, indicated at 17 and 18, which have internal tapered threads indicated at 19 which are complementary to the tapered threads 16 on the fitting. The balance of the interior of the hubs is so shaped as to have a substantial clearance 20 with the exterior of the pipe ends except for an internal flange 21 which is spaced from the tapered threads 19 a substantial distance. In the usual situation the spacing of the flange 21 from the inner ends of the threads 19 is approximately ¾". The outer ends of the hubs are internally grooved as at 22 to form a lead-lock.

To insert the fitting in the pipe line the pipe line is cut at points which are spaced from each other a distance slightly greater than the overall length of the fitting so that there will be a small clearance 23 between the ends of the fitting and the pipe ends to facilitatae the insertion of the fitting therebetween. Prior to the insertion of the fitting, however, the hubs 17 and 18 are slipped onto the pipe ends 10 and 11 as illustrated in Fig. 1. The fitting 12 is then inserted between the pipe ends and the hubs are screwed onto the tapered threads 16. Thereafter oakum 24 or other sealing material is caulked into the hubs in the clearance space 20 against each flange 21 and this sealing material is locked in place by running in lead or the equivalent, indicated at 25, in the usual or conventional manner.

It will be noted from the above described construction that the over-all length of the insert fitting can be made relatively short which is highly desirable in that these fittings are usually inserted in pipe lines that have already been installed. Frequently the space accessible to the pipe or allowable to the insert fitting is limited and for this reason the insert fitting should be made as short as is reasonably possible. Due to the use of the tapered threads at 16 and 19 the hubs when they are screwed up onto the fitting will form a leakproof joint which may be aided somewhat by the application of white lead or plumber's dope to these threads prior to making up the tapered joint. As the flange 21 on each hub forms a shoulder against which the oakum or packing 24 can be caulked which is spaced from the clearance space 23 a substantial distance there is no danger of strands of the oakum or other packing material entering the clearance space 23 and thus partially clogging the pipe line or forming an obstruction on which clogging material may collect. The exteriors of the hubs may be ribbed as at 26 to enable the application of a turning implement by which the hubs can be screwed onto the fitting.

I am aware of prior insert fittings such as those illustrated in U. S. Letters Patent No. 2,297,966, issued October 6, 1942, to H. J. Luff. Therein is disclosed an insert fitting the ends of which are threaded with straight or non-tapered threads. The use of such threads is essential therein to enable the hubs to be telescoped onto the ends of the fitting. When such a design is employed the fitting is necessarily excessively long as each end of the fitting must be of adequate length to completely receive the hub during insertion of the fitting in the pipe line. Furthermore by the use of straight threads which are necessary for this arrangement a leakproof joint cannot be obtained. The construction also has the disadvantage that the oakum or similar packing material must be caulked against an internal shoulder on the hub immediately adjacent the threads and is consequently crowded into the clearance space between the ends of the fitting and the ends of the pipe line. My improved fitting overcomes all of these disadvantages in that (1) the fitting itself need not be excessively long; (2) the use of tapered threads is permissible which will make up to form a leakproof joint; and (3) the caulking of the oakum takes place against the flange 21 at a point remote from the clearance space 23 so that strands have no opportunity to enter this clearance space.

From the above described construction it will be appreciated that an improved insert fitting has been provided which can be easily and economically manufactured and installed with considerable advantage.

Various changes may be made in the details of construction without departing from the spirit and scope of the invention as defined by the appended claims.

I claim:

1. An insert fitting for a pipe line comprising a conduit section adapted to be inserted between spaced ends of a pipe line, said section having external tapered threads at the opposite ends thereof, and hubs having internal threads complementary to said threads adapted to be slipped onto the pipe line ends prior to the insertion of the fitting and then screwed onto the threaded ends of the fitting, the interior of each of the hubs having a substantial clearance with respect to the pipe line ends on both sides of an internal annular flange spaced from the threads of the hubs and against which oakum may be caulked.

2. An insert fitting for a pipe line comprising a conduit section adapted to be inserted between spaced ends of a pipe line, said section having outwardly tapering external threads at the opposite ends thereof, and hubs having internal threads complementary to said threads adapted to be slipped onto the pipe line ends prior to the insertion of the fitting and then screwed onto the threaded ends of the fitting, each of said hubs having an internal shoulder which is spaced from the ends of the hub.

ERNEST E. ROSECRANS, Sr.

REFERENCES CITED

The following references are of record in the file of this patent:

UNITED STATES PATENTS

| Number | Name | Date |
|---|---|---|
| 655,033 | Vanderman | July 31, 1900 |
| 666,316 | Kenneally | Jan. 22, 1901 |
| 1,142,225 | August | June 8, 1915 |
| 1,282,561 | Foley | Oct. 22, 1918 |
| 1,492,522 | Meyer | Apr. 29, 1924 |
| 2,169,069 | Kaufman | Aug. 8, 1939 |
| 2,297,966 | Luff | Oct. 6, 1942 |
| 2,457,648 | Donner | Dec. 28, 1948 |